United States Patent

Sundaram et al.

[11] Patent Number: 5,912,791
[45] Date of Patent: Jun. 15, 1999

[54] LANDING ZONE DESIGN FOR A MAGNETIC DISC

[75] Inventors: Ramesh Sundaram, Eden Prairie; Subrahmanyan Nagarajan, Burnsville, both of Minn.

[73] Assignee: Seagate Technology, Inc., Scotts Valley, Calif.

[21] Appl. No.: 08/876,215

[22] Filed: Jun. 16, 1997

Related U.S. Application Data

[60] Provisional application No. 60/040,788, Mar. 14, 1997.
[51] Int. Cl.$^6$ ....................................... G11B 5/82
[52] U.S. Cl. ............................................. 360/135
[58] Field of Search ...................... 360/133, 135

[56] References Cited

U.S. PATENT DOCUMENTS

| | | | |
|---|---|---|---|
| 5,062,021 | 10/1991 | Ranjan | 360/135 |
| 5,446,606 | 8/1995 | Brunner et al. | |
| 5,482,497 | 1/1996 | Gonnella et al. | |
| 5,499,731 | 3/1996 | Marshall | |
| 5,508,077 | 4/1996 | Chen et al. | |
| 5,550,696 | 8/1996 | Nguyen | |
| 5,586,040 | 12/1996 | Baumgart et al. | |
| 5,626,941 | 5/1997 | Ouano | 428/414 |
| 5,635,269 | 6/1997 | Wier | 360/135 |

*Primary Examiner*—A. J. Heinz
*Attorney, Agent, or Firm*—Westman, Champlin & Kelly

[57] ABSTRACT

A data storage disc having an improved landing zone for supporting a head gimbal assembly for takeoff and landing. The improved landing zone having a landing surface formed of a patterned surface structure. The patterned surface structure including contact surfaces formed generally flush with a disc surface and depressions formed into the disc surface at predefined spaced location and extending below the disc surface. The patterned surface structure reducing stiction for "takeoff" of a slider from the disc surface and reducing interference of the slider and disc surface while flying over a transition zone at the edge of the data zone and landing zone.

22 Claims, 8 Drawing Sheets

LANDING ZONE DESIGN FOR A MAGNETIC DISC

CROSS-REFERENCE TO RELATED APPLICATION

This application claims priority to provisional application Ser. No. 60/040,788, filed Mar. 14, 1997, and entitled "CONTINUOUS SPIRAL LINE LASER TEXTURE TO IMPROVE TAKE-OFF LANDING AND DYNAMICS OF LASER TEXTURE".

FIELD OF THE INVENTION

The present invention relates to a disc construction of a disc drive. In particular, the present invention relates to an improved disc surface design for a disc of a disc drive.

BACKGROUND OF THE INVENTION

Disc drives are well known in the industry. Such drives use rigid discs coated with a magnetizable medium for storage of digital information in a plurality of concentric data tracks. Typically, disc drives include a disc pack including a plurality of concentric discs mounted on a spindle motor which causes the disc to spin. The disc drive also includes head gimbal assemblies aligned with each disc surface. The head gimbal assemblies include a disc head slider which supports transducers or magnetoresistive elements for reading and writing data to the data tracks of the disc surfaces.

The slider includes an air bearing surface which faces the disc surface. As the disc rotates, the disc drags air onto the slider along the air bearing surface in a direction approximately parallel to the tangential velocity of the disc. As the air passes beneath the air bearing surface, the pressure between the disc and the air bearing surface increases, which creates a hydrodynamic lifting force that causes the slider to lift directly above the disc surface to read and write data to the surface of the discs.

Prior to rotation of the disc, the slider rests on the disc surface. The slider is not lifted from the disc until the hydrodynamic lifting force, caused by rotation of the disc, is sufficient to overcome a preload force supplied to bias the slider toward the disc surface. Thus, the hydrodynamic properties of the slider are affected by the speed of rotation of the disc, the design of the air bearing surface of the slider, and the preload force supplied to the head gimbal assembly.

Known discs include both landing zones and data zones on a disc surface. Data is stored in the data zone. Landing zones are used to support the slider when the disc drive is not in operation and provide a takeoff and landing surface for the slider. Landing zones contain no data because repeat contact by the slider would eventually destroy any data stored.

Textured landing zones are known which provide a roughened surface for reducing stiction between the slider and the disc surface for takeoff. Landing zones are also known which include bumps of different shapes and sizes formed on a disc surface by a laser technique or other technique to provide a surface for the slider to take off and land. Bumps provide lower contact area between the slider and disc surface to lower the stiction force holding the slider to the disc surface.

Disc drives are being designed which have lower slider fly heights. Disc storage space is also at a premium; and, thus, disc drives are designed to store data to edges of the data zone abutting the landing zone. Landing zones which are formed of bumps may interfere with the slider at lower fly heights when the slider is aligned to retrieve data at a transition zone at the edges of the landing and data zones. Interference of the slider with bumps at low fly heights may causes the bumps to deform, or may cause the head to crash. Bumps also interfere with the hydrodynamic air flow to the slider bearing surface, thus interfering with the flying characteristics of the slider. Repeat contact of the slider with the bumps during takeoff, and landing cause the bumps to deform under the stress of the slider over time, thus decreasing effectiveness of the bumps in reducing stiction.

SUMMARY OF THE INVENTION

The present invention relates to an improved is landing surface for a landing zone of a data disc. The improved landing surface includes a patterned surface structure having contact surfaces formed generally flush with the disc surface and depressions formed into the disc surface in a predefined spaced pattern and extending below the disc surface in a predefined spaced array pattern. The depressions reduce the contact area of the slider with the disc surface, thus providing a lower stiction for the slider from the landing zone. It also alleviates concern about bumps interfering with the slider when the slider is positioned to retrieve data at the transition zone at the edge of the landing and data zones.

It should be noted that the foregoing drawings are not necessarily drawn to scale and that certain features of the drawings have been exaggerated for clarity.

DETAILED DESCRIPTION OF THE PREFERRED EMBODIMENTS

Figure 1:
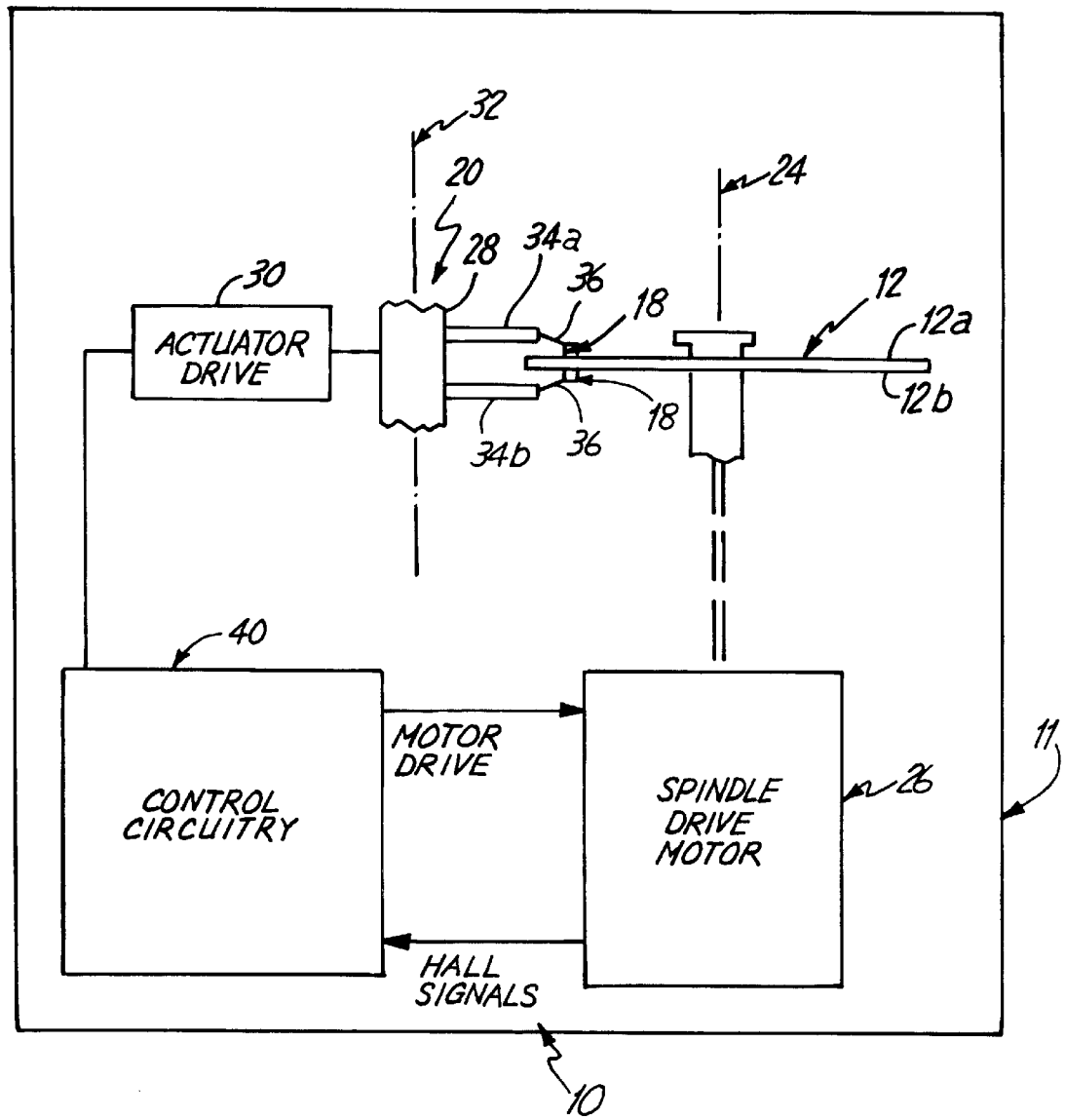
FIG. 1 is a schematic illustration of a disc drive.

FIG. 1 is a schematic view illustrating a disc drive 10. As shown, disc drive 10 includes a housing 11 (shown schematically), disc 12, and a plurality of head gimbal assemblies (HGA) 18, which are supported relative to disc 12 and actuated by actuator assembly 20. The disc 12 is supported for rotation about spindle axis 24 by a spindle motor 26. The head gimbal assemblies 18 support a disc head slider via a gimbal spring (not shown) for reading and writing information to upper and lower disc surfaces 12a–12b in a known manner. Although a single disc 12 is shown, the disc drive 10 may include a plurality of discs 12 supported for co-rotation about spindle axis 24.

The actuator assembly 20 includes an actuator block 28 and actuator drive 30. Actuator block 28 is rotationally coupled to housing 11 for operation about a pivot axis 32 in a known manner. A plurality of spaced stacked actuator arms 34a–b extend from the actuator block 28 in alignment with upper and lower disc surfaces 12a and 12b. The HGAs 18 are coupled to actuator arms 34a–b via load beams 36. As shown, actuator arm 34a supports HGA 18 in alignment with an upper disc surface 12a, and actuator arm 34b supports HGA 18 in alignment with a lower disc surface 12b. Actuator drive 30, which is typically a voice coil motor, pivots actuator block 28 about the pivot axis 32 for alignment with selected data tracks of disc 12. Operation of the spindle motor 26 and actuator drive 30 are controlled via control circuitry 40 of disc drive 10. For a multidisc drive, additional actuator arms 34 are included to support HGAs 18 relative to a plurality of discs 12.

Figure 2:
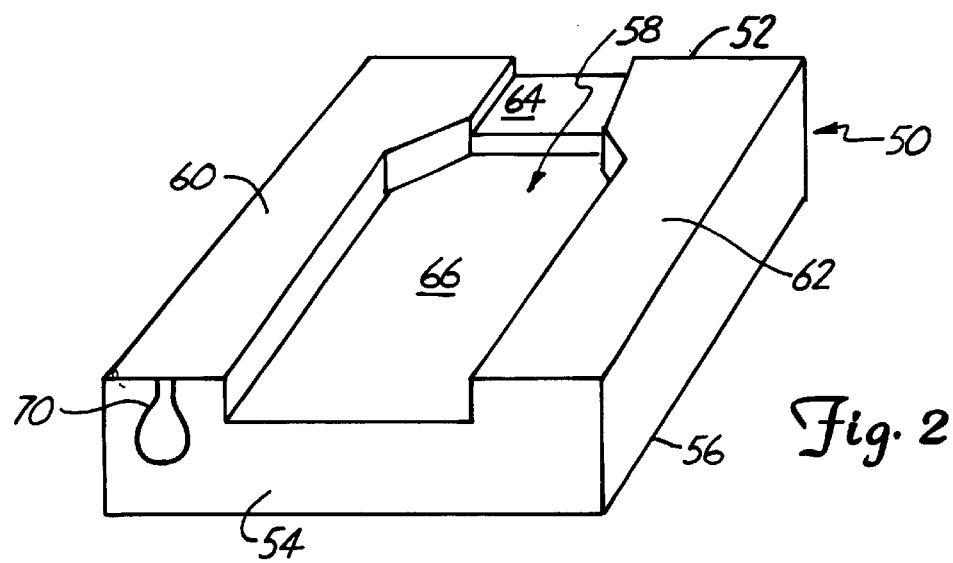
FIG. 2 is a perspective view of a disc head slider, shown with the air bearing surface of the slider facing upwardly.

Discs 12 are rotated to create a hydrodynamic lifting force to lift the head gimbal assemblies 18 to fly above the disc surfaces for operation to read and write data in a known manner. FIG. 2 illustrates one embodiment of a slider 50 designed to fly above a disc surface. As shown, slider 50 is formed of a rigid member including a leading edge 52, a trailing edge 54, an upper surface 56, and a lower air bearing surface 58. The upper surface 56 is operably coupled to a gimbal spring (not shown) to flexibly support slider 50 to provide a resilient connection that allows the slider to pitch, roll and follow the topography of the disc surface in a known manner. The lower air bearing surface 58 faces the disc surface and includes raised rails 60 and 62, cross rail 64, and a recessed subambient pressure cavity 66. Rotation of discs 12 provides flow of air from the leading edge 52 towards the trailing edge 54 along the air bearing surface 58 of slider 50. The raised rails 60 and 62 are positioned along opposed sides of the slider 50 and provide a high-pressure surface, and the recessed subambient pressure cavity 66 provides a low pressure surface for creating a hydrodynamic lifting force to lift the head gimbal assembly 18 to fly across the disc surface.

The trailing edge 54 includes an active transducer 70 formed at raised rails 60 or 62 for reading and writing data to the disc surface 12a, 12b. In the embodiment shown, the active transducer is aligned on raised rail 60. The active transducer 70 is positioned on either rail 60 or 62, depending upon whether the slider 50 is coupled to the upper or lower actuator arm 34a–b. Slider 50 in FIG. 2 is included for illustration, and it is not intended that the invention be limited to any particular slider design. For example, alternative slider designs are known that include a center rail for supporting a transducer and shortened side rails defining the air bearing surface.

Figure 3:
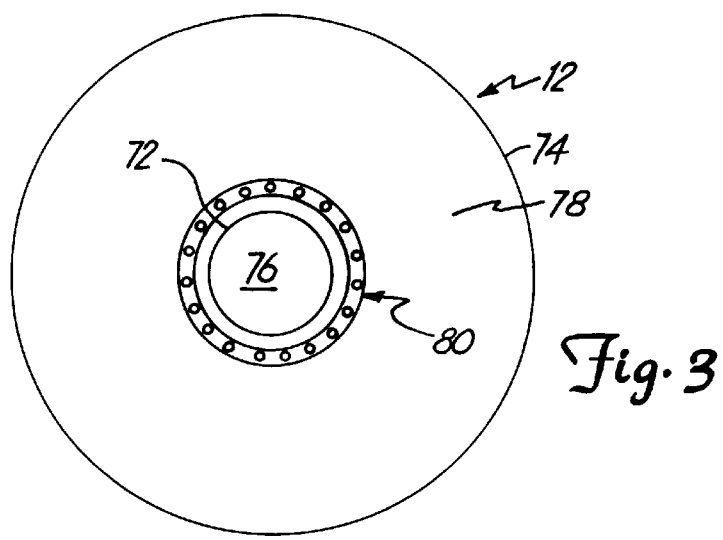
FIG. 3 is a schematic illustration of a magnetic disc having a landing zone and a data zone.

FIG. 3 illustrates a disc 12 having an inner diameter 72, an outer diameter 74, a spindle hole 76 a data zone 78 and a landing zone 80. Spindle motor 26 extends through spindle hole 76 to rotate disc 12. Typically, landing zone 80 is formed proximate to the inner diameter 72. In particular, the landing zone 80 is formed proximate to the inner diameter 72, a spaced distance from the inner diameter 72 to allow area for a spindle motor clamp (not shown) to secure the spindle motor 26 and discs 12 for operation. The width of the landing zone 80 corresponds to the width of the slider 50 to support the slider 50. Although the particular disc illustrated in FIG. 3 has a landing zone 80 proximate to the inner diameter 72, the present invention is not limited to any particular placement of landing zone 80 on disc surface 12a or 12b.

The landing zone 80 is designed to facilitate the takeoff and landing of head gimbal assemblies 18 from disc surface 12a or 12b. Prior to "takeoff", the slider 50 rests on the landing zone 80 surface. If the landing zone surface is smooth, a sufficient force will be required to overcome the stiction holding the slider to the landing zone surface. It is known to mechanically texture the surface of the landing zone by a tape texturing process to reduce the stiction between slider 50 and the disc surface. However, landing zones 80 fabricated by mechanical texturing tend to wear over time due to repeat contact of the slider 50 with the landing zone surface. This reduces the stiction reducing characteristics of the mechanical texturing.

Figure 4A:
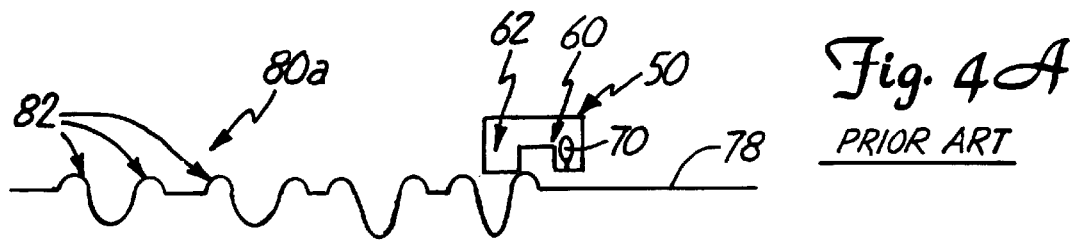
FIGS. 4A–4B are enlarged partial side-elevational views illustrating bumps formed in prior art landing zones.
Figure 4B:
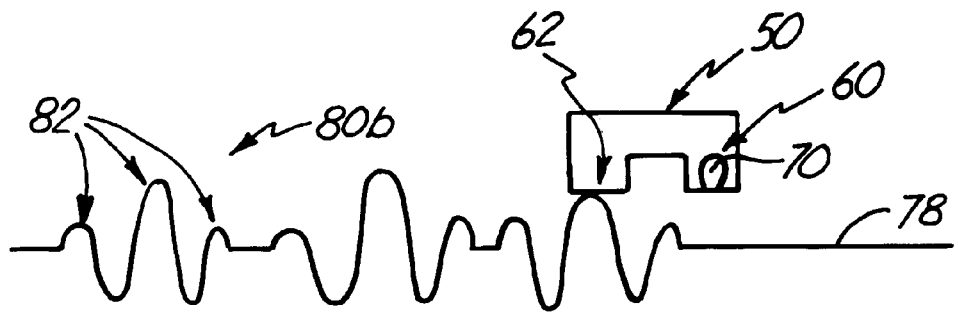

Other known landing zone designs 80a and 80b incorporate bumps 82 as illustrated in FIGS. 4A–4B. The bumps 82 are formed above the disc surface to define raised contact surfaces for the slider 50. Since the contact area (i.e. bumps 82) between the landing zone 80a–b and slider 50 is reduced, the stiction between the landing zone 80a–b and slider 50 is also reduced. Bumps 82 may be formed by a laser technique or other techniques. In particular, the bumps 82 may be formed by a pulsating laser. FIGS. 4A–4B illustrate two different laser bump patterns. However, repeat contact of the slider 50 with the bumps 82 during "takeoff" and landing causes the bumps 82 to deform over time, thereby increasing the contact surface of the bumps 82 and thus, stiction.

As illustrated in FIGS. 4A–4B, when active transducer 70 on side rail 60 is positioned to read/write data to a data track proximate to the edge of the data zone and edge of the landing zone, a portion of the slider is in the data zone (i.e., rail 62), and a portion of the slider is positioned relative to the landing zone (i.e., rail 60). In particular, side rail 62, which does not include an active transducer, overhangs the landing zone 80. The portion of the data zone and landing zone at the edge of the landing zone and data zone defines a transition zone. In the prior landing zone designs illustrated in FIGS. 4A–4B, the overhanging side rail 62 could crash into the bumps 82 at low fly heights, thus tending to wear down the bumps 82 and degrade the performance characteristics of the landing zone unless the slider 50 flies high enough to avoid hitting the bumps 82. Interference of slider 50 and bumps 82 may lead to catastrophic failure of a disc drive. The surface of prior landing zones 80a–80b also causes air bearing perturbations, affecting the flying characteristics of slider 50.

Figure 4C:
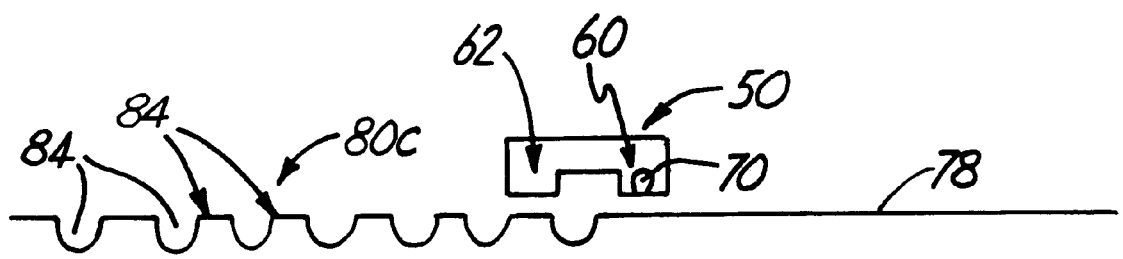
FIG. 4C is an enlarged partial side-elevational view of an embodiment of an improved landing zone including contact surfaces and depressions.

The present invention relates to an improved landing zone design 80c as illustrated in FIG. 4C. The landing surface of the landing zone 80c has a patterned surface structure. The patterned surface structure includes contact surfaces 84 which are formed by the disc surface and a uniformly spaced pattern of depressions 86 formed into and extending below the disc surface. The contact surfaces 84 support slider 50 in a resting position, and depressions 86 reduce stiction between the disc surface and the slider 50. The landing zone design 80c of the present invention provides a stable landing zone surface which provides desired stiction characteristics between the slider 50 and the landing surface and desired "take-off" velocities for the slider 50. In the landing zone design 80c of the present invention illustrated in FIG. 4C, slider 50 may be flown at relatively low fly heights in the transition zone above the patterned landing surface without interference.

The patterned landing zone of the present invention is formed in the disc substrate. Preferably, the landing zone 80c of the present invention is formed in the disc substrate using known laser techniques and lapping techniques. A laser technique used to form the landing zone 80c of the present invention includes a lapping process not used to form bumps of prior landing zones 80a–b. In particular, FIGS. 5A–5D illustrate formation of one embodiment of a landing surface of the present invention and FIGS. 5E–5H illustrate another embodiment of a landing surface of the present invention.

Figure 5A:
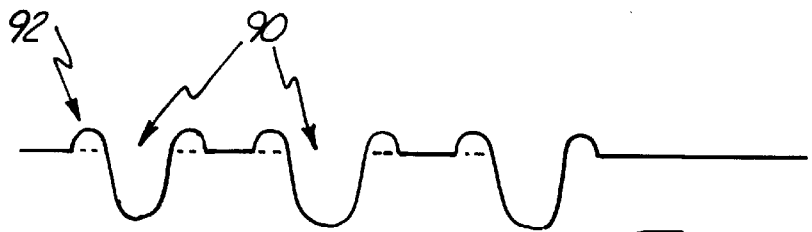
FIGS. 5A–5B illustrate formation of depressions by a laser technique in an embodiment of the improved landing surface of the present invention.
Figure 5B:
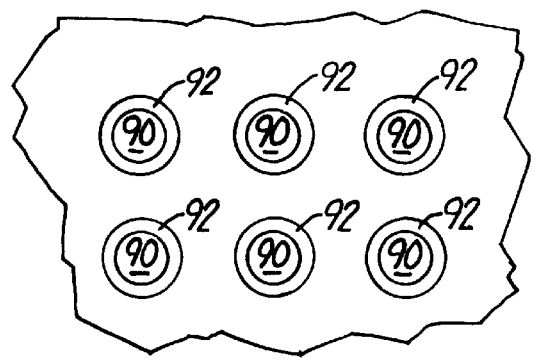
Figure 5C:
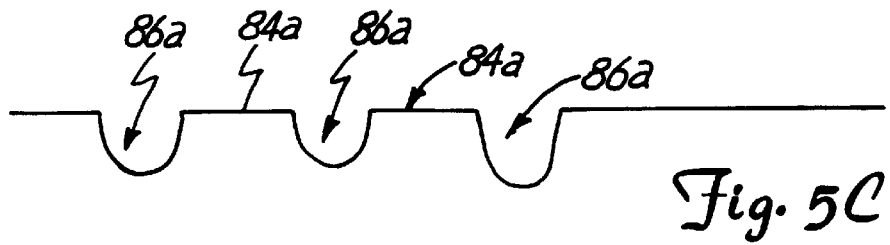
FIGS. 5C–5D illustrate the process of lapping raised portions of FIGS. 5A–5B formed by the laser technique for one embodiment of the improved landing surface of the present invention.
Figure 5D:
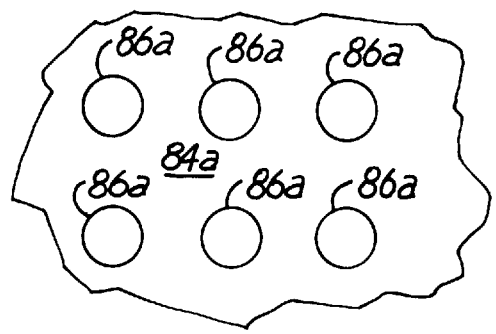
Figure 5E:
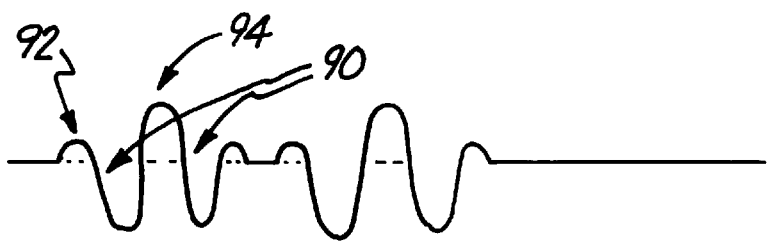
FIGS. 5E–5F illustrate formation of depressions by a laser technique of another embodiment of an improved landing surface of the present invention.
Figure 5F:
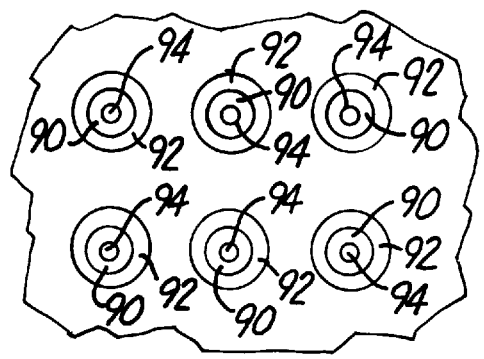
Figure 5G:
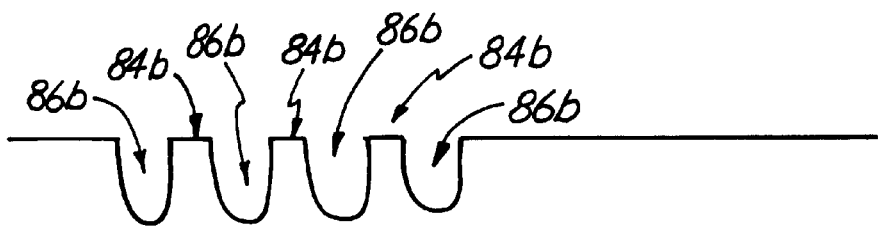
FIGS. 5G–5H illustrate the process of lapping raised portions and bumps of FIGS 5E–5F formed by the laser technique for another embodiment of the improved landing surface of the present invention.
Figure 5H:
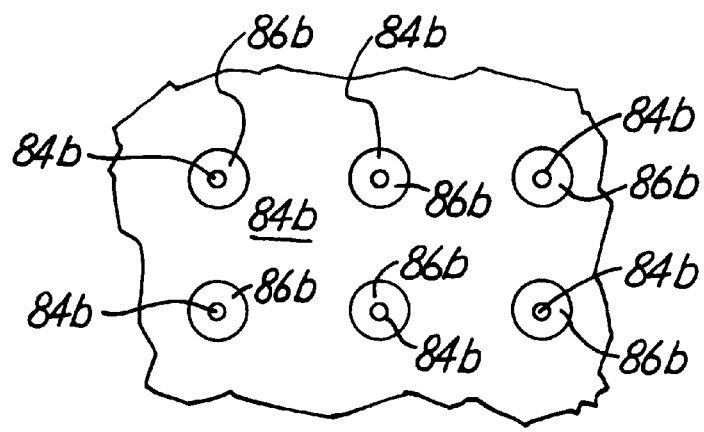

As illustrated in FIGS. 5A–5B, a pulsating laser may be used to form a pattern of craters 90 into the disc surface surrounded by raised rims 92. Thereafter to form the improved patterned landing zone from the laser pattern illustrated in FIGS. 5A and 5B, the rims 92, which extend above the substrate surface, are lapped by known grinding techniques or surface treatment techniques. Thus, craters 90 form circular-shaped depressions 86a formed into the disc substrate and lapped surfaces of rim 92 and the substrate surface form the contact surfaces 84a as illustrated in FIGS. 5C–5D. Alternatively, as illustrated in FIGS. 5E–5F, a laser may be used to form craters 90, surrounded by raised rims 92, and central bumps 94. Thereafter, the rims 92 and central bumps 94 are lapped to form ring shaped depressions 86b; and lapped central bumps 94 and rims 92 and substrate surface form the contact surfaces 84b.

Figure 6A:
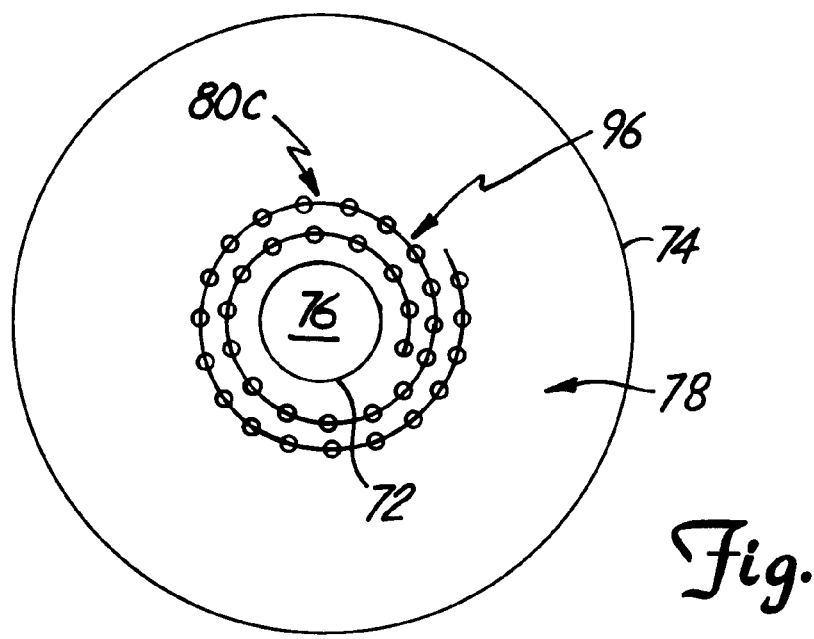
FIGS. 6A–6C are schematic views illustrating various patterns of depressions in the disc surface of the improved landing zone.
Figure 6B:
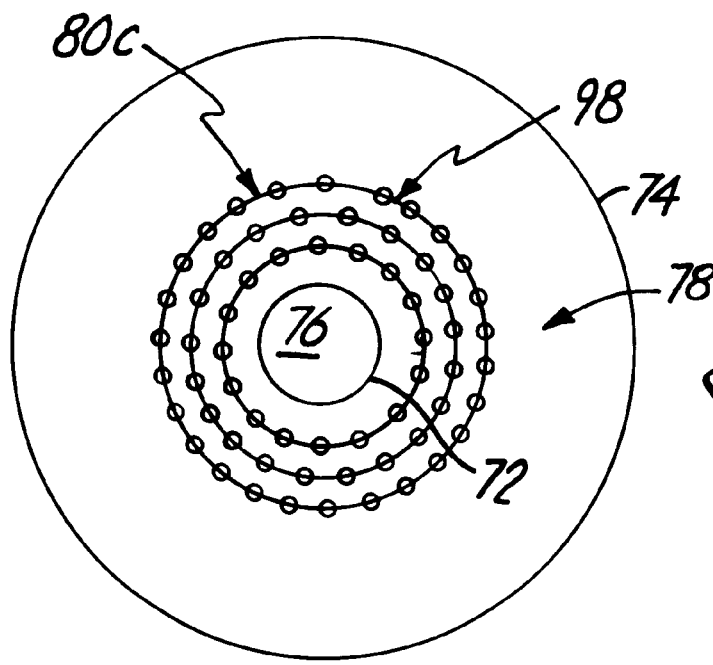
Figure 6C:
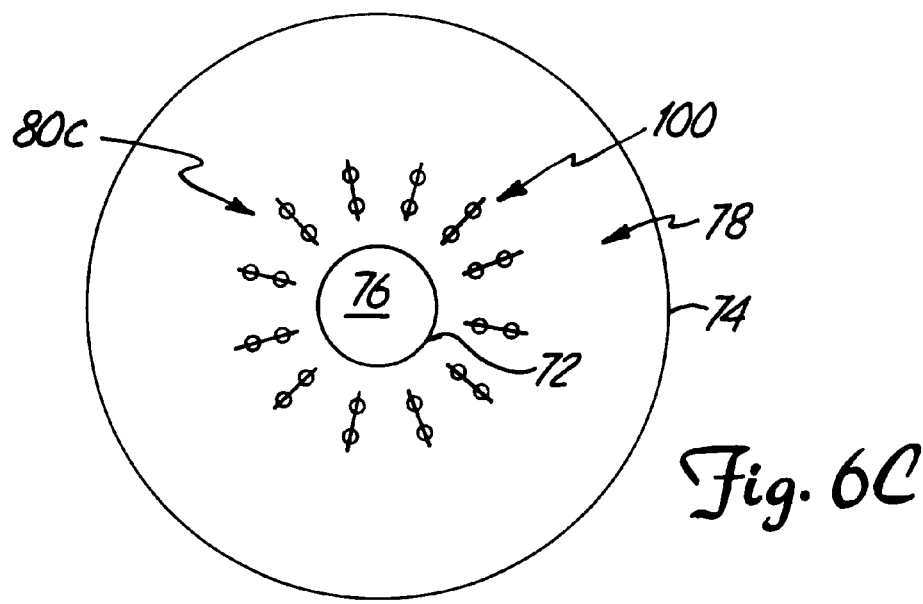

Depressions 86a, 86b of FIGS. 5C–5D and FIGS. 5G–5H are essentially located in a predefined spaced array pattern. FIGS. 6A–6C illustrate patterns for forming depressions using a pulsating laser. For example, a pulsating laser may be directed in a spiral pattern 96 to form a predefined spaced array pattern of depressions in the disc substrate, as shown in FIG. 6A. In particular, the disc substrate is mounted for rotation while a pulsating laser beam is directed in a spiral pattern 96. The laser pattern of FIGS. 6A–6C is represented by a line having depressions 86 illustrated therealong. Alternatively, the beam of the pulsating laser can be moved in a concentric step pattern 98 to form predefined spaced depressions in the disc substrate. Also, the beam of the pulsating laser can be directed along a radial path, from a position proximate to the inner diameter 72, outwardly at step locations in a radially directed series pattern 100 as illustrated in FIG. 6C to form predefined spaced depressions 86.

Figure 7:
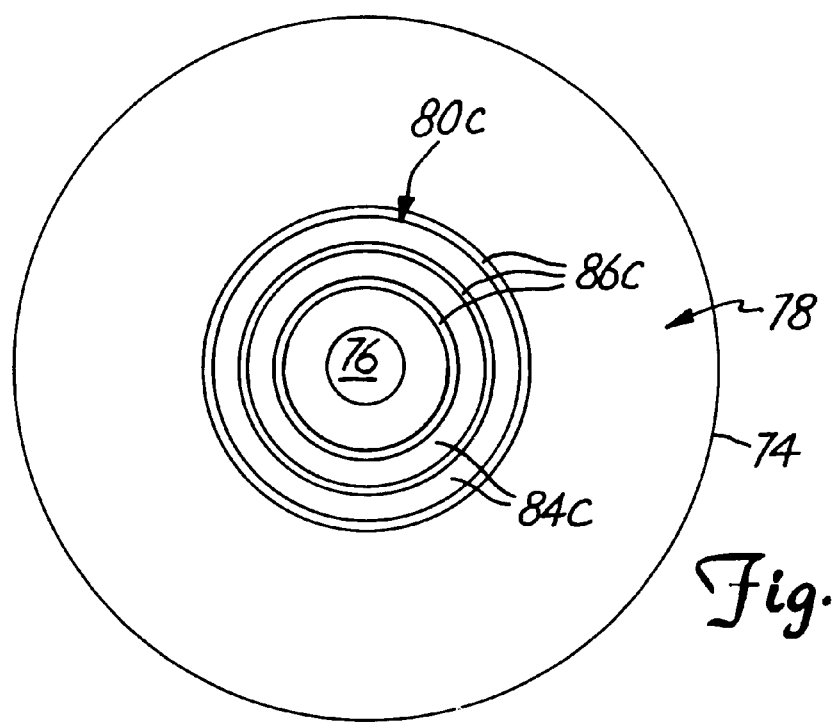
FIG. 7 is a schematic view illustrating concentric ring depressions formed by a continuous laser process about the circumference of the disc.

Alternatively, the landing surface may include a spaced pattern of concentric ring-shaped depressions 86c formed with a continuous laser (or "CW laser") as illustrated in FIG. 7. A plurality of continuous spaced concentric rings depressions 86c are formed in the substrate surface about the circumference of the disc in the landing zone 80c to form continuous concentric ring depressions 86c. Raised rims about the concentric ring depressions 86c are lapped to form contact surfaces 84c. Description of depressions 86c formed by a continuous laser is disclosed in provisional application Ser. No. 60/040,788, filed Mar. 14, 1997 and entitled "CONTINUOUS SPIRAL LINE LASER TEXTURE TO IMPROVE TAKEOFF LANDING DYNAMICS OF LASER TEXTURE", which is hereby incorporated by reference into the present application.

Depressions 86 of the landing surface of the present invention are formed into the disc surface and are not formed at the disc surface by texturing the surface of the disc. The depressions 86 are formed in a uniformly spaced pattern on the landing zone surface and each depression 86 generally has a predetermined size (e.g. diameter) or depth to define a controlled stiction reducing pattern. Textured surfaces do not define a uniform pattern, nor depressions having a predefined size and depth to provide a predetermined stiction reducing pattern. Preferably, the depth of the depressions is approximately 20–40 nanometers.

Thus, in the patterned landing zone structure of the present invention, the contact surfaces 84 for supporting slider 50 are defined by the generally planar substrate surface and not by bumps 82 of prior landing zone designs as illustrated in FIGS. 4A–4B. Since the area of the planar substrate surface defining the contact area is larger than the area of bumps 82 defining the contact area of prior landing zone designs, it is necessary to provide a dense patterned array of depressions 86 to provide acceptable stiction reduction for acceptable "take off" velocity of the slider 50. The size and spacing between depressions 86 depends upon the characteristics of the slider and is designed to facilitate acceptable take-off and landing characteristics as is known in the art.

An alternative method for forming a predefined spaced array pattern of depressions 86 in the substrate surface uses known photolithographic processes. The depressions 86 may be formed using either positive or negative photolithographic techniques for forming a uniform pattern of depressions 86 in the disc surface 12a, 12b. The disc substrate may be formed of a glass or metal substrate and it is not intended that the invention be limited to any particular substrate material. Depressions are formed on both sides of the substrate to form a dual-sided disc. A magnetizable medium and a hydrodynamic lubricant are applied to the surface of the substrate to form the magnetic disc having depressions in the landing zone.

The improved landing surface eliminates the interference between the slider 50 and landing zone surface at low fly heights. The landing surface also provides a stable landing surface having surface characteristics which reduce stiction and provide acceptable take-off velocities for a slider. The depressions of the landing surface provide a stiction reducing surface that does not degrade rapidly with repeat contact with the slider.

It should be understood that various methods may be employed to form the landing zone of the present invention and it is not intended that the invention be limited to any particular method. Additionally, the depressions may be formed of various sizes and shapes and the invention is not intended to be limited to the particular shapes shown. Although the present invention has been described with reference to preferred embodiments, workers skilled in the art will recognize that changes may be made in form and detail without departing from the spirit and scope of the invention.

What is claimed is:

1. A data storage disc comprising:

a data zone having a relatively smooth data surface at a data surface plane for reading and writing data; and a landing zone on the disc surface including a patterned surface structure having an exposed contact surface at relatively the same elevation as the relatively smooth data surface for supporting a slider and depressions formed into the disc surface in the landing zone in a predefined spaced pattern and extending below the data surface plane.

2. The data storage disc of claim 1 wherein the depressions are formed having a generally uniform size and depth.

3. The data storage disc of claim 1 wherein the depressions are circular shaped.

4. The data storage disc of claim 1 wherein the depressions are ring shaped.

5. The data storage disc of claim 1 wherein the depressions are formed by a laser process.

6. The data storage disc of claim 1 wherein the contact surfaces are formed by a lapping process.

7. The data storage disc of claim 1 wherein the depressions are formed by a photolithographic process.

8. The data storage disc of claim 1 wherein the disc includes an inner diameter formed by a spindle hole and an outer diameter, and the landing zone is positioned proximate to the inner diameter.

9. A disc drive comprising:

a housing;

at least one data storage disc rotatably coupled to the housing, said data storage disc including a data zone having a relatively smooth data surface at a data surface plane for reading and writing data;

a spindle assembly coupled to the housing and the data storage disc for rotating the data storage disc;

an actuator assembly coupled to the housing, the actuator assembly movably supporting a head gimbal assembly relative to the disc surface for operation in data zone and landing zone, the head gimbal assembly including a disc head slider; and a landing zone on the disc surface, the landing zone having a landing surface characterized by a patterned surface structure having an exposed contact surface formed at relatively the same elevation as the relatively smooth data surface plane for supporting the disc head slider and depressions formed below the data surface plane elevation in the landing zone in a predefined spaced pattern.

10. The disc drive of claim 9 wherein the depressions are formed having a generally uniform size and depth.

11. The disc drive of claim 9 wherein the depressions are circular shaped.

12. The disc drive of claim 9 wherein the depressions are ring shaped.

13. The disc drive of claim 9 wherein the depressions are formed by a laser process.

14. The disc drive of claim 9 wherein the contact surfaces are formed by a lapping process.

15. The disc drive of claim 9 wherein the depressions are formed by a photolithographic process.

16. The disc drive of claim 9 wherein the disc includes an inner diameter formed by a spindle hole and an outer diameter, and the landing zone is positioned proximate to the inner diameter.

17. A method for constructing a disc of a disc drive comprising the steps of:

providing a disc substrate having a substrate surface;

laser-texturing a portion of the substrate surface to form a pattern of depressions in the disc substrate; and lapping surfaces raised above the height of the substrate surface so that the raised surfaces are generally flush with the substrate surface, the substrate surface forming a contact surface for supporting a slider.

18. The method of claim 17 wherein the patterned surface defining the landing zone is formed by a photolithographic process.

19. The method of claim 18 wherein a pulsating laser forms a pattern of depressions in the disc substrate.

20. The method of claim 19 wherein the pulsating laser is directed in a stepped concentric ring pattern to form depressions.

21. The method of claim 19 wherein the pulsating laser is directed in a spiral pattern to form depressions.

22. The method of claim 19 wherein the pulsating laser is directed in spaced radially directed pattern to form depressions.

* * * * *